TWO-WIRE MULTIUNIT INTERCOM SYSTEM
Filed Aug. 5, 1968
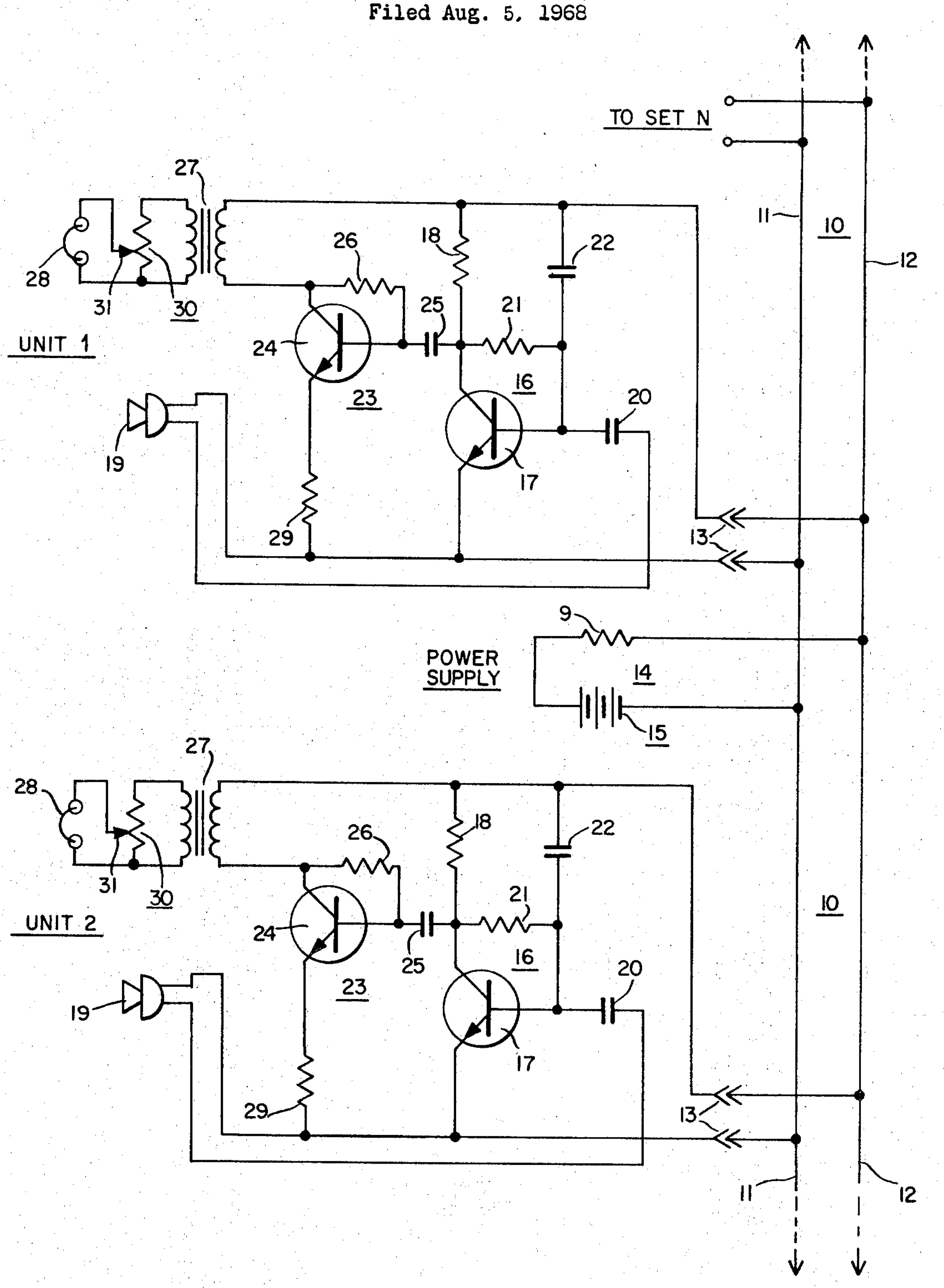
INVENTOR.
Nathaniel Dickerson
BY
Charles F. Duffield
ATTORNEY.

United States Patent Office 3,531,594
Patented Sept. 29, 1970

3,531,594

TWO-WIRE MULTIUNIT INTERCOM SYSTEM

Nathaniel Dickerson, 640 W. Phil-Ellena, Philadelphia, Pa. 19119

Filed Aug. 5, 1968, Ser. No. 750,044
Int. Cl. H04m 9/02
U.S. Cl. 179—1 3 Claims

ABSTRACT OF THE DISCLOSURE

A multiunit intercom system which employs a two wire conductor on which there is imposed a DC bias. Each of the intercom units includes a first amplifier circuit which derives its input power from the DC bias and is so connected across the two conductors of the transmission cable that an audio input bias to the amplifier will be reflected into the transmission cable and be superimposed as an AC signal upon the DC bias. Each of the intercom units includes capacitive coupling which is responsive to the audio signal superimposed upon the DC bias to provide a second audio input to the other amplifiers along the transmission cable. Each of the intercom units includes an earphone responsive through a second stage amplifier to the output of the first amplifier circuit to provide the audio output for the intercom.

SUMMARY AND OBJECTS OF INVENTION

The present invention relates to multiunit intercom systems and, specifically, to a two wire switchless intercom system in which transmission and reception may occur simultaneously.

Intercom systems in use today may employ either two or three wires in the system between any given two intercom units. These two wire intercoms, however, are not entirely satisfactory in that they employ send/receive switching which will permit the unit to only receive or transmit at any given time.

The three wire units do provide a separate circuit for transmission and for reception at a given unit. However, the use of three wires in this type intercom system may be impractical or impossible. For example, in some fixed or pre-existing installations, there may only be two conductors available for use in an intercom system. Thus, it is imperative that, if an intercom system is to be used at all, it must function on the two conductors available.

Additionally, an intercom system which can perform satisfactorily on two wires has many advantages even in a multi-conductor cable. It is apparent that a reduction from three to two wires represents a one-third reduction in the total number of conductors necessary for a given number of independent intercom systems. Such a reduction can be very significant in the terms of size, weight, and expense of the multiconductor cable necessary for such a system.

Accordingly, it is an object of the present invention to provide a multiunit intercom system which employs only a two wire conductor and operates without send/receive switching.

The intercom system of the present invention carries out the foregoing object by advantageously utilizing feedback to the amplifier power supply which heretofore has been considered an undesirable characteristic of an amplifier circuit. More specifically, a DC bias is impressed, through a load resistance, across the two conductors of the two wire system. An amplifier circuit is connected across the two conductors and derives its power supply therefrom. By reason of the load impedence in the power supply providing the DC bias on the two conductors, whenever an audio input bias is applied to the amplifier, the audio output of the amplifier will be reflected into the two conductors providing the power supply to the amplifier and superimposed as an audio signal component upon the DC bias.

This audio signal component on the two conductors is capacitively coupled as a second input to all of the amplifiers of each of the intercoms in the system which, in response thereto, provide an audio output which is connected, through a second stage amplifier, to the earphone of each intercom.

Other meritorious features and objects of the present invention will appear from the following detailed description thereof.

DESCRIPTION OF DRAWINGS

FIG. 1 is a wiring schematic of the present invention showing two intercom units connected thereto.

DETAILED DESCRIPTION OF INVENTION

The multiunit intercom system of the present invention is shown in FIG. 1. A plurality of intercom units or sets may be employed in the system of the present invention although only two such sets are shown in FIG. 1.

Each of the intercom units are identical one to another and are connected, by means of plug terminals 13, across a common transmission cable 10 which employs two independent conductors 11 and 12.

A power supply 14 is likewise connected across the two conductors 11 and 12. The power supply 14 includes a battery 15 and a load impedance 16 shown in FIG. 1 as a resistor. The power supply 14, through the load resistor 16, maintains a DC bias upon the two conductors 11 and 12 of the common transmission cable 10.

Each of the intercom units employs a first amplifier circuit 16 therein. The amplifier circuit 16 includes an NPN transistor 17, the emitter and collector of which are connected across the DC bias on conductors 11 and 12 through a load resistor 18 associated with the collector of the transistor.

A microphone 19, preferably of the dynamic type, is connected across the base to emitter junction of transistor 17 through a coupling capacitor 20. Resistor 21 across the base to collector junction of transistor 17 maintains the transistor 17 operative as a class A amplifier.

Upon the presence of an audio signal to the microphone or transducer 19, the resultant audio bias applied across the base to emitter junction of transistor 17 will be amplified and appear at the collector of transistor 17. Since the power supply 14 includes the load resistor 16, the voltage variations at the collector of the transistor 17, will be divided across both resistors 16 and 18. The result will be that a portion of the amplified audio signal will be superimposed upon the DC bias on the two conductors 11 and 12 of the transmission cable 10.

Each of the intercom units further includes a capacitor 22 connected between the base of the transistor 17 and the positive conductor 12. The capacitor 22 serves to couple the audio signal component overriding the DC bias on lines 11 and 12 across the base to emitter junction of transistor 17 as a second input bias thereto. The audio signal present on the transmission line 10 will thus be amplified across each of the transistors 17 in each of the other intercom units and switching between transmitting and receiving positions is eliminated.

A second amplifier circuit 23 is also utilized in each of the intercom units. This amplifier circuit includes an NPN transistor 24 whose collector and emitter are connected across the DC bias on lines 11 and 12 through load resistor 29 as in the case of transistor 17. The base of the transistor 24 is connected to the collector of transistor 17 by means of a coupling capacitor 25. A resistor 26 between the collector and base of transistor 24 permits the transistor to operate as a class A amplifier.

In this manner, the amplified audio signal present at the collector of transistor 17 is further amplified through transistor 24. An audio transformer 27 in the collector circuit of transistor 24 passes the reinforced audio signal to a second transducer or earphone 28 disposed in each of the intercom units.

A potentiometer 30 across the secondary windings of audio transformer 27 provides a volume control, through slider 31, for the earphone 28.

Accordingly, an audio input signal to any of the microphones 19 at any of the intercoms will be amplified and applied as an audio signal component to the DC bias present on the transmission cable 10. The resultant audio signal component will be sensed, without switching, by each of the other intercom units and amplified through transistors 17 and 24 and subsequently applied as an audio output at each of the speakers 28.

The intercom circuit demonstrates excellent fidelity and can operate in a high noise area with good clarity. Further, the solid state configuration of the system requires little power, to operate with adequate volume. Lastly, the intercom of the present invention permits "hands-free" communication between a relatively large group.

The multiunit two-wire intercom system of the present invention has been described in respect to a particular embodiment thereof shown in FIG. 1 of the drawings. However, it is anticipated that other variations and modifications to the invention may be made without departing from the scope and spirit of the following claims.

I claim:

1. An intercom system comprising;

a two conductor transmission cable;

a DC power supply connected through a load impedance across said transmission cable providing a DC bias thereon;

a plurality of intercom units;

each of said intercom units including a first amplifier circuit connected across said transmission cable with said DC bias as the power supply thereto;

first transducer means responsive to an audio input thereto connected as a first input bias to said first amplifier circuit;

coupling means responsive to an audio signal component on said transmission cable connected as a second input bias to said first amplifier circuit; and second transducer means responsive to the output of said first amplifier circuit providing an audio output therefrom whereby an audio input to any of said first transducer means will super-impose an audio signal component upon said DC bias on said transmission cable which will be amplified by the others of said first amplifier circuits and presented as an audio output to all of said second transducer means.

2. The intercom system of claim 1 further including a second amplifier circuit connected across said transmission cable with said DC bias as the power supply thereto and in which the output of said first amplifier circuit provides the input bias to said second amplifier circuit and the output of said second amplifier circuit provides the input to said second transducer means.

3. The intercom system of claim 1 in which said first amplifier circuit includes a transistor having its emitter and collector connected, through a load resistor, across the two conductors of said transmission cable and in which said coupling means includes capacitive means connecting the emitter-base junction of said transistor across the two conductors of said transmission cable.

References Cited

UNITED STATES PATENTS

| | | | |
|---|---|---|---|
| 3,027,428 | 3/1962 | Eklöv | 179—1 XR |
| 3,372,239 | 3/1968 | Clement | 179—81 |

FOREIGN PATENTS

| | | |
|---|---|---|
| 1,200,370 | 3/1964 | Germany. |

KATHLEEN H. CLAFFY, Primary Examiner

C. W. JIRAUCH, Assistant Examiner

U.S. Cl. X.R.

179—37, 81